United States Patent
Cole et al.

(10) Patent No.: US 12,059,967 B2
(45) Date of Patent: Aug. 13, 2024

(54) SYSTEMS AND METHODS FOR ELECTRIC VEHICLE CHARGING USING IMAGE CAPTURING DEVICES

(71) Applicant: ABB E-mobility B.V., Delft (NL)

(72) Inventors: Gregory A. Cole, West Hartford, CT (US); William J. Eakins, Coventry, CT (US); Stefan J. Raaijmakers, Delft (NL)

(73) Assignee: ABB E-mobility B.V., Delft (NL)

( * ) Notice: Subject to any disclaimer, the term of this patent is extended or adjusted under 35 U.S.C. 154(b) by 1061 days.

(21) Appl. No.: 16/920,095

(22) Filed: Jul. 2, 2020

(65) Prior Publication Data
US 2022/0001761 A1    Jan. 6, 2022

(51) Int. Cl.
*B60L 53/00* (2019.01)
*B60L 53/37* (2019.01)
(Continued)

(52) U.S. Cl.
CPC ............... *B60L 53/37* (2019.02); *G06T 7/73* (2017.01); *G06T 7/90* (2017.01); *G06V 10/143* (2022.01);
(Continued)

(58) Field of Classification Search
CPC ... B60L 53/37; G06T 7/73; G06T 7/90; G06T 2207/20024; G06T 2207/30248;
(Continued)

(56) References Cited

U.S. PATENT DOCUMENTS 10,518,658 B1 * 12/2019 Eakins .................. H01R 43/26
10,739,274 B2 * 8/2020 Nonaka ................ H04N 23/695
(Continued)

FOREIGN PATENT DOCUMENTS

WO    WO 2019/139463 A2    7/2019

OTHER PUBLICATIONS

European Patent Office, International Preliminary Report on Patentability in International Patent Application No. PCT/IB2021/055770, 15 pp. (Jan. 12, 2023).
(Continued)

*Primary Examiner* — Phutthiwat Wongwian
*Assistant Examiner* — Sherman D Manley
(74) *Attorney, Agent, or Firm* — Leydig, Voit & Mayer, Ltd.

(57) ABSTRACT

A plug connection system that autonomously charges an electric vehicle (EV) is provided. The method includes: adjusting configuration settings of an image capturing device; capturing an image using the image capturing device, wherein a portion of the image comprises an optically distinctive object associated with a charging portal of the EV, and wherein the image comprises a plurality of pixels; applying a pixel value threshold associated with a pixel metric to the image to filter the plurality of pixels of the image to a first subset of pixels; determining, based on filtering the plurality of pixels to the first subset of pixels, a location of the optically distinctive object associated with the charging portal of the EV within the image; and providing information to maneuver a robotic arm to a physical position associated with the location of the optically distinctive object within the image.

19 Claims, 8 Drawing Sheets

(51) Int. Cl.
   *G06T 7/73*     (2017.01)
   *G06T 7/90*     (2017.01)
   *G06V 10/143*   (2022.01)
   *G06V 20/00*    (2022.01)
   *G06V 20/10*    (2022.01)

(52) U.S. Cl.
   CPC .............. *G06V 20/00* (2022.01); *G06V 20/10* (2022.01); *G06T 2207/20024* (2013.01); *G06T 2207/30248* (2013.01)

(58) Field of Classification Search
   CPC ...... G09V 10/143; G06V 20/00; G06V 20/10; G06V 2201/08; Y02T 10/70; Y02T 10/7072; Y02T 90/12; Y02T 90/14
   See application file for complete search history.

(56) References Cited

U.S. PATENT DOCUMENTS

| | | | | |
|---|---|---|---|---|
| 11,003,972 | B2* | 5/2021 | Meng | G06K 19/0723 |
| 11,030,774 | B2* | 6/2021 | Parchami | G05D 1/0088 |
| 11,207,997 | B2* | 12/2021 | Shin | H02J 7/0045 |
| 11,305,658 | B2* | 4/2022 | Fagan | H01R 13/631 |
| 2008/0212840 | A1 | 9/2008 | Shalom et al. | |
| 2012/0105668 | A1 | 5/2012 | Velarde et al. | |
| 2019/0340782 | A1* | 11/2019 | Sinha | G06T 7/13 |
| 2021/0086639 | A1* | 3/2021 | Rakuff | B60L 53/31 |
| 2021/0387537 | A1* | 12/2021 | Bech | B60L 53/16 |
| 2023/0182592 | A1* | 6/2023 | Garcia-Ferre | B60L 53/16 439/296 |
| 2023/0241991 | A1* | 8/2023 | Kaufmann | B60L 53/302 439/485 |

OTHER PUBLICATIONS

European Patent Office, International Search Report in International Patent Application No. PCT/IB2021/055770, 5 pp. (Sep. 28, 2021).
European Patent Office, Written Opinion in International Patent Application No. PCT/IB2021/055770, 13 pp. (Sep. 28, 2021).

* cited by examiner

400

SYSTEMS AND METHODS FOR ELECTRIC VEHICLE CHARGING USING IMAGE CAPTURING DEVICES

FIELD

The present disclosure relates to an automatic electric vehicle-charging system.

BACKGROUND

Automatic charging of electric vehicles (EVs) is perceived in the EV industry as an important business opportunity because it enables a high degree of safety during charging, which, in turn, enables use of high charging power ratings (fast-charging), improves operational efficiency in charging fleet vehicles or vehicles at a public charge station, and increases customer comfort.

A key technical challenge for an EV charging system is identifying a physical position of an EV charging portal (e.g., EV inlet) on the EV and creating an accurate registration in order to enable automatic charging of the EV. Traditionally, EV charging systems have attempted to remedy this problem by using solely 2 dimensional (2-D) image processing, 3 dimensional (3-D) vision systems, active fiducials placed on the EV inlet, or QR codes positioned on or near the EV inlet. However, all of these approaches suffer from major drawbacks. For instance, 2-D image processing requires a large amount of computational bandwidth, especially around classification and segmentation, which may drive the cost of the system up by requiring the use of a tensor processing unit (TPU) or similar processing device to account for the huge amount of processing overhead. 3-D vision systems may be computationally efficient on a main processor or controller, but at the expense of significant cost increases on the camera/sensor side of the EV charging system and even then, are still highly susceptible to environmental conditions. Active fiducials (e.g., devices with their own light and/or power source) mounted on the EV are challenged by higher vehicle costs and vehicle specific installations. For instance, active fiducials may include their own light source that provides light/illumination. QR codes are easily damaged or dirtied, which may render them ineffective. Accordingly, there remains a technical need for a low cost and computationally efficient system for identifying the position of the EV inlet to enable automatic charging.

SUMMARY

A first aspect of the present disclosure provides a plug connection system for use in autonomously charging an electric vehicle (EV), the plug connection system. The plug connection system comprises a robotic arm that is controllably extendable and retractable, wherein the robotic arm is adapted to carry a charging plug located at a distal end of the robotic arm, wherein the charging plug is configured to be controllably moveable and insertable into a charging portal of the EV. The plug connection system further comprises an image capturing device configured to capture one or more images, wherein the image capturing device is set to a new image capturing characteristic that is different from a default image capture characteristic. The plug connection system further comprises a control system. The control system comprises one or more controllers and a non-transitory computer-readable medium having processor-executable instructions stored thereon. The processor-executable instructions, when executed by the one or more controllers, facilitate: capturing an image using the image capturing device, wherein a portion of the image comprises an optically distinctive object associated with the charging portal of the EV, and wherein the image comprises a plurality of pixels; applying a pixel value threshold associated with a pixel metric to the image to filter the plurality of pixels of the image to a first subset of pixels; determining, based on filtering the plurality of pixels to the first subset of pixels, a location of the optically distinctive object associated with the charging portal within the image; and providing information to maneuver the robotic arm to a physical position associated with the location of the optically distinctive object within the image.

According to an implementation of the first aspect, the plug connection system further comprises a light emitter configured to emit illumination for the image capturing device. The control system captures the image using the illumination from the light emitter.

According to an implementation of the first aspect, the image capturing device comprises the light emitter. The control system captures a plurality of images associated with the optically distinctive object and the charging portal of the EV. The plurality of images comprises at least one image captured using the illumination from the light emitter and at least one image captured using no illumination from the light emitter.

According to an implementation of the first aspect, the control system applies the pixel value threshold by: filtering out pixels from the plurality of images using the pixel value threshold to determine a second subset of pixels, wherein each pixel from the second subset of pixels has a corresponding pixel metric that satisfies the pixel value threshold, and wherein providing the information to maneuver the robotic arm is based on the second subset of pixels.

According to an implementation of the first aspect, the image capturing device is situated on the charging plug. The plug connection system further comprises a second image capturing device configured to provide a second image to the control system, and wherein providing the information to maneuver the robotic arm is further based on the second image.

According to an implementation of the first aspect, the control system captures a plurality of images based on a set frequency. The plurality of images comprises a first image captured at a first instance in time and a second image captured at a second instance in time. The first and second instances in time are associated with the set frequency. The control system applies the pixel value threshold by applying the pixel value threshold to the first image and to the second image. The control system provides information to maneuver the robotic arm to the physical location by: providing first instructions to maneuver the robotic arm to a first physical location based on applying the pixel value threshold to the first image; and providing second instructions to maneuver the robotic arm from the first physical location to a second physical location based on applying the pixel value threshold to the second image.

According to an implementation of the first aspect, the pixel value threshold is a luminance value threshold, and the control system applies the pixel value threshold by filtering the plurality of pixels of the image to the first subset of pixels based on comparing the luminance value threshold with luminance values associated with the plurality of pixels.

According to an implementation of the first aspect, the pixel value threshold is a color characteristic threshold associated with red, green, blue (RGB) values of the plurality of pixels, and the control system applies the pixel value threshold by filtering the plurality of pixels of the image to the first subset of pixels based on comparing the color characteristic threshold with the RGB values of the plurality of pixels.

According to an implementation of the first aspect, the image capturing device is a 2 dimensional (2-D) camera, and the plug connection system further comprises the optically distinctive object adaptable to the charging portal of the EV.

According to an implementation of the first aspect, the control system determines the location of the optically distinctive object associated with the charging portal based on analyzing the first subset of pixels using a known geometric profile associated with the charging portal of the EV.

According to an implementation of the first aspect, the plug connection system further comprises a non-visible light emitter configured to emit non-visible illumination for the image capturing device, wherein the non-visible illumination is associated with a light frequency in a non-visible range.

A second aspect of the present disclosure provides a method for a plug connection system to autonomously charge an electric vehicle (EV). The method comprises: adjusting, by a control system, configuration settings of an image capturing device from a default image capturing characteristic to a new image capturing characteristic; capturing, by the control system, an image using the image capturing device, wherein a portion of the image comprises an optically distinctive object associated with a charging portal of the EV, and wherein the image comprises a plurality of pixels; applying, by the control system, a pixel value threshold associated with a pixel metric to the image to filter the plurality of pixels of the image to a first subset of pixels; determining, by the control system and based on filtering the plurality of pixels to the first subset of pixels, a location of the optically distinctive object associated with the charging portal of the EV within the image; and providing, by the control system, information to maneuver a robotic arm to a physical position associated with the location of the optically distinctive object within the image.

According to an implementation of the second aspect, the robotic arm is controllably extendable and retractable, the robotic arm is adapted to carry the charging plug located at a distal end of the robotic arm, and the charging plug is configured to be controllably moveable and insertable into the charging portal of the EV.

According to an implementation of the second aspect, the control system captures the image using the image capturing device by capturing the image using illumination from a light emitter.

According to an implementation of the second aspect, the illumination is non-visible illumination associated with a light frequency in a non-visible range.

According to an implementation of the second aspect, the control system captures the image by capturing a plurality of images associated with the optically distinctive object and the charging portal of the EV. The plurality of images comprises: at least one image captured using the illumination from the light emitter; and at least one image captured using no illumination from the light emitter.

According to an implementation of the second aspect, the control system captures the image by capturing a plurality of images based on a set frequency. The plurality of images comprises a first image captured at a first instance in time and a second image captured at a second instance in time. The first and second instances in time are associated with the set frequency. The control system applies the pixel value threshold by applying the pixel value threshold to the first image and to the second image. The control system provides information to maneuver the robotic arm to the physical location by: providing first instructions to maneuver the robotic arm to a first physical location based on applying the pixel value threshold to the first image; and providing second instructions to maneuver the robotic arm from the first physical location to a second physical location based on applying the pixel value threshold to the second image.

According to an implementation of the second aspect, the pixel value threshold is a luminance value threshold, and the control system applies the pixel value threshold by filtering the plurality of pixels of the image to the first subset of pixels based on comparing the luminance value threshold with luminance values associated with the plurality of pixels.

According to an implementation of the second aspect, the pixel value threshold is a color characteristic threshold associated with red, green, blue (RGB) values of the plurality of pixels, and the control system applies the pixel value threshold by filtering the plurality of pixels of the image to the first subset of pixels based on comparing the color characteristic threshold with the RGB values of the plurality of pixels.

A third aspect of the present disclosure provides a non-transitory computer-readable medium having processor-executable instructions stored thereon. The processor-executable instructions, when executed by one or more controllers, facilitate: adjusting configuration settings of an image capturing device from a default image capturing characteristic to a new image capturing characteristic; capturing an image using the image capturing device, wherein a portion of the image comprises an optically distinctive object associated with a charging portal of an electric vehicle (EV), and wherein the image comprises a plurality of pixels; applying a pixel value threshold associated with a pixel metric to the image to filter the plurality of pixels of the image to a first subset of pixels; determining, based on filtering the plurality of pixels to the first subset of pixels, a location of the optically distinctive object associated with the charging portal of the EV within the image; and providing information to maneuver a robotic arm to a physical position associated with the location of the optically distinctive object within the image.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
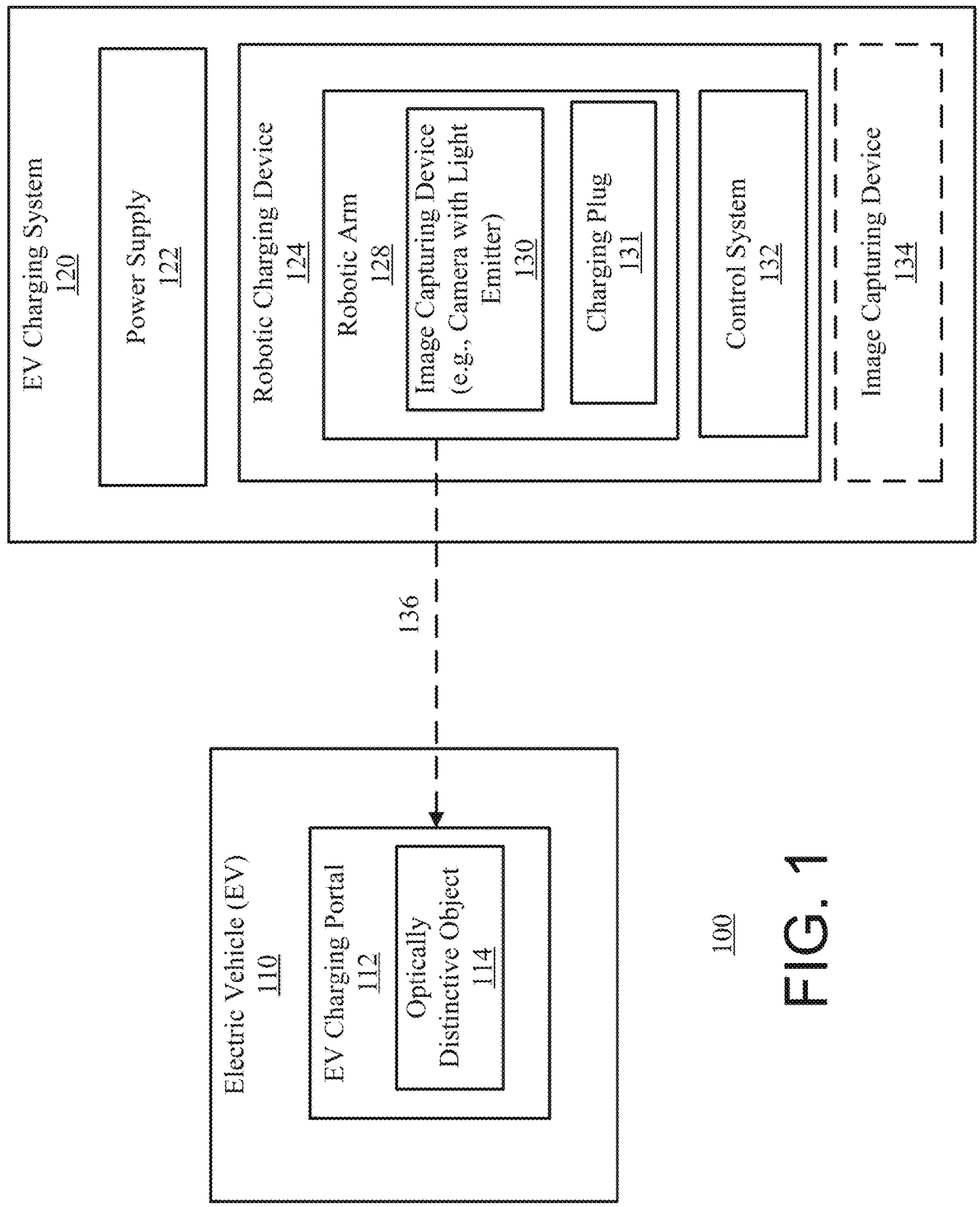
FIG. 1 illustrates a simplified block diagram depicting an electric vehicle (EV) charging environment according to one or more embodiments of the present disclosure.

The present disclosure describes an automatic electric vehicle (EV) charging system and environment, which provides advantages over the state of the art. For example, the present disclosure provides an optically distinctive object (e.g., a retroreflective or reflective material, sticker, tag, label, and/or structure) that may enable a low cost 2 dimensional (2-D) image capturing system (e.g., vision system) to classify and segment an EV charging portal (e.g., EV inlet) with minimal processing. For instance, the pixels in the images may be represented by numerous individual characteristics or measurements of colors such as red green blue (RGB) and/or luminance values. In some instances, the EV charging system may use a light emitter to emit light (e.g., flash from a camera) in combination with a 2-D image capturing device and an optically distinctive object with a same or similar geometry to the pins or slots of an EV charging portal/charging device to segment, classify, and/or identify the EV charging portal on the vehicle. For instance, the pixels of the optically distinctive object may have a unique color return profile. By rejecting or filtering pixels that do not have the expected signature of the object, the EV charging system may be able to identify the location of the EV charging portal with minimal processing.

In other words, by combining active illumination (e.g., a flash) with a retroreflective or reflective object that has a known color response and is applied to/adaptable to the vehicle, the EV charging system may determine the location of the EV charging portal using a low cost 2-D sensor with a low cost computational platform. For example, when the flash is combined with the retroreflective object, this leverages the auto-white balance inherent to the low cost 2-D image capturing devices to wash out and dim other objects and structures within the image. When the color values are averaged in each pixel to give an approximation of the luminance, there is a clear differentiation between the pixels on the retroreflective/reflective object versus the rest of the objects/structures within the image. Although there may be spurious pixels that have high luminance values, the EV charging system may be able to easily differentiate these pixels from the pixels representing the retroreflective/reflective object because geometry of the spurious pixels may represent a small patch or thin linear structure whereas the retroreflective/reflective object may have known geometry with a large number of high luminance pixels that are grouped together. This will be described in further detail below.

Exemplary aspects of the charging systems and charging devices, according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

FIG. 1 illustrates a simplified block diagram depicting an electric vehicle (EV) charging environment 100 according to one or more embodiments of the present disclosure.

Referring to FIG. 1, the EV charging environment 100 includes an electric vehicle (EV) 110 and an electric vehicle (EV) charging system 120. Among other components, systems, and/or entities such as an engine and/or transmission, which are not shown, the EV 110 includes an EV charging portal 112 such as an EV inlet. An optically distinctive object 114 (e.g., a retroreflective and/or reflective object) is applied to (e.g., adaptable to) the EV charging portal 112. The object 114 may be and/or include a sticker, tag, label, and/or structure that is designed with a retroreflective material, reflective material, and/or other light reflecting materials. For example, the object 114 may include a retroreflective or reflective coating on the surface of the object 114, or a molded pattern using a different, retroreflective or reflective material that is molded into the object 114 in a particular pattern, such that it amplifies and/or otherwise causes easier identification of the EV charging portal 112. The object 114 will be described in further detail below.

The EV charging system 120 (e.g., plug/charging plug connection system) includes an automated-robotic charging device 124 and a power supply 122. The robotic charging device 124 includes a robotic arm 128 and a control system 132. The robotic arm 128 includes an image capturing device (e.g., camera with a light emitter) 130 and is adapted to engage and carry a charging plug 131. In one embodiment, the charging plug 131 may be integrated with the robotic arm 128, while in another embodiment the robotic arm 128 may be separate from, but engageable to carry, the charging plug 131. Additionally, in some examples, the EV charging system 120 may optionally include an image capturing device 134. When present, the image capturing device 134 may be similar to the image capturing device 130 and capture images of the EV charging portal 112 with the object 114.

The power supply 122 may be an EV charging unit (EVCU), which supplies high voltage for charging. The power supply 122 may be usable with or without the robotic charging device 124. The EV charging system 120 is configured to automatically and/or conveniently charge the EV 110, without human intervention or interaction, thus, providing a safe and convenient charging experience for the user or operator of the EV 110.

The power supply 122 receives AC power (e.g., from a utility power supply), and converts and conditions the main supply to a power suitable for charging an EV 110 (e.g., a DC voltage with a sufficient current rating for rapid charging of EVs). The power supply 122 is electrically coupled to the robotic charging device 124 to provide charging power to the charging device 124. The robotic charging device 124 may then supply the charging power to the EV 110, in an automated and operator-free manner. A control system 132 of the charging device may communicate with the power supply 122 (e.g., to provide loose or tight control of the charging).

The EV charging system 120 and in particular, the control system 132 may detect when an EV 110 is within a predetermined proximity to the robotic charging device 124 and determine a physical position of the EV charging portal 112 on the EV 110. Based on the control system 132 determining the EV 110 and its EV charging portal 112 are within reach of the robotic charging device 124, the control system 132 uses the images captured by the image capturing device 130 to maneuver (e.g., guide, orient, move, displace, and/or actuate) the robotic arm 128 and position its charging plug 131 to be in close proximity to the charging portal 112. In some examples, the charging plug 131 and the image capturing device 130 may both be integrated or otherwise operably included in the end effector of the robotic arm 128. In other examples, the image capturing device 130, or an additional image capturing device 130, may be disposed at another location on or around the EV charging system 120, for example, at its base, instead of or in addition to the single image capturing device 130 shown in FIG. 1. The robotic charging device 124 then configures the charging plug 131 to be inserted into the EV charging portal 112, and charges the EV 110. The dotted line 136 represents the extension of the robotic arm 128 to the EV charging portal 112 of the EV 110. Once the charging is completed (or is otherwise stopped), the robotic charging device 124 removes the charging plug 131 from the EV charging portal 112, and retracts the robotic arm 128.

In some instances, the control system 132 maneuvers the robotic arm 128 by changing the physical position and/or orientation of the charging plug 131 of the robotic arm 128 such that it becomes aligned for insertion into the EV charging portal 112 of the EV 110. For instance, the control system 132 may first move the robotic arm 128 to be within a close proximity of the EV charging portal 112 and may then orient the charging plug 131 such that it becomes aligned for insertion into the EV charging portal 112. In other instances, the control system 132 may dynamically move the robotic arm 128 and orient the charging plug 131 in any order (including contemporaneously), providing for a smooth movement and insertion of the charging plug into the charging portal 112.

The control system 132 uses one or more images, or a continuous succession or series of images, captured using an image capturing device 130 to maneuver the robotic arm 128 such that it becomes aligned with the EV charging portal 112. For example, the control system 132 captures an image that includes the EV charging portal 112 with the object 114. The image includes a multitude of pixels and the control system 132 filters out the pixels to identify the EV charging portal 112 based on pixel metrics or characteristics. For instance, the pixels representing the object 114 that is applied to the charging portal 112 may have distinguishing characteristics such as a luminance value that exceeds a certain threshold. By using this threshold, the control system 132 identifies a location of the object 114 within the captured image and uses this location to maneuver the robotic arm 128 and/or the charging plug 131 towards the EV charging portal 112. This will be described in further detail below.

Figure 2A:
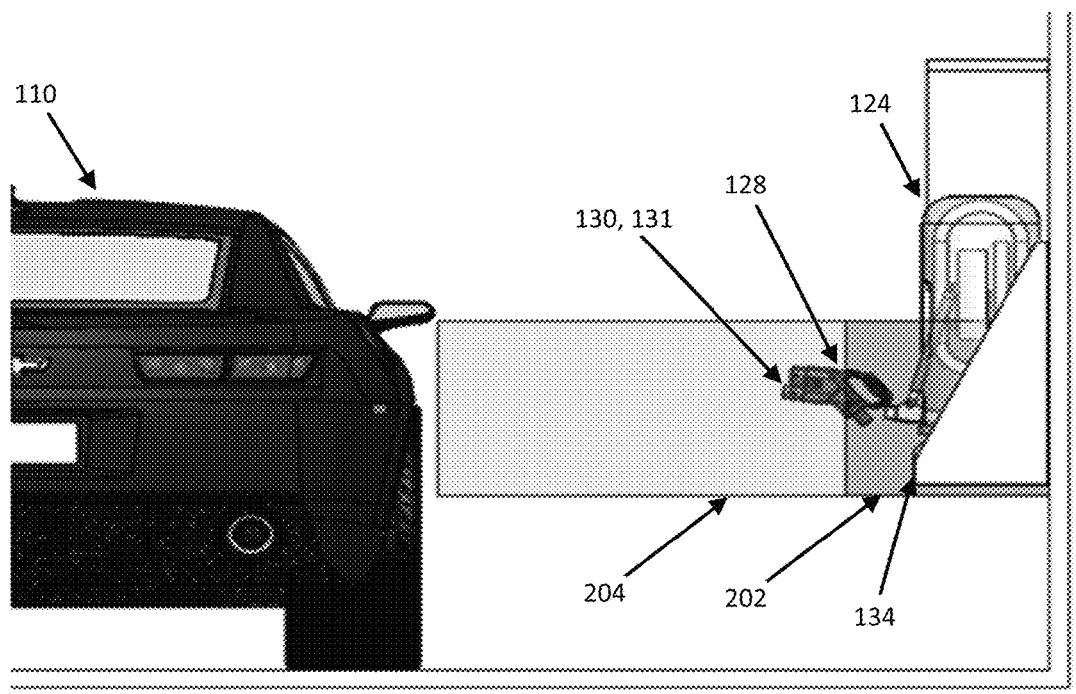
FIG. 2a illustrates an exemplary electric vehicle (EV) charging environment with an EV charging system in a collapsed, docked state according to one or more embodiments of the present disclosure.
Figure 2B:
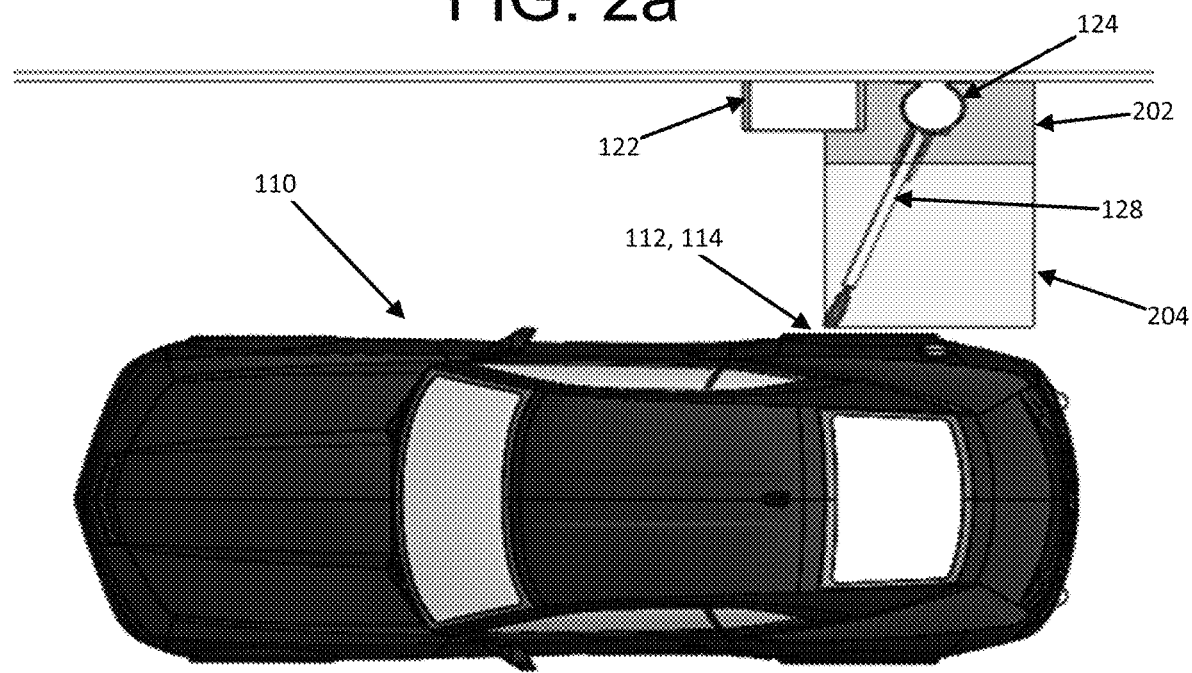
FIG. 2b illustrates the exemplary electric vehicle (EV) charging environment of FIG. 2a with the EV charging system in a charging state.

FIG. 2a illustrates an exemplary electric vehicle (EV) charging environment 200 with an EV charging system in a collapsed, docked state according to one or more embodiments of the present disclosure and FIG. 2b illustrates the exemplary electric vehicle (EV) charging environment 200 of FIG. 2a with the EV charging system in a charging state. However, it will be appreciated that the EV charging environment 200 with the EV charging systems shown in FIGS. 2a and 2b are merely examples of the EV charging environment 100 from FIG. 1 and additional/alternative embodiments of EV charging environments, systems, and/or devices are contemplated within the scope of the present disclosure. For instance, in additional and/or alternative embodiments, the EV charging environment 100 may include a different robotic arm 128 assembly such as a scissor link mechanism for the robotic arm 128, or a different charging arrangement for the vehicle such as a vehicle having its charging plug on the undercarriage of the vehicle.

Referring to FIGS. 2a and 2b, the EV charging environment 200 includes the robotic charging device 124 and the power supply 122. The robotic charging device 124 includes the robotic arm 128 with a charging plug 131. The EV charging environment 200 further includes the EV 110. The EV 110 includes an EV charging portal 112 with the object 114 applied to it.

Furthermore, the EV charging environment 200 includes two image capturing devices 130 and 134. For instance, the image capturing devices 130 and 134 may be attached to or included within the EV charging system 120. For instance, the image capturing device 134 may be mounted, physically positioned, operatively coupled to, and/or fastened to a base of the robotic charging device 124. The image capturing device 130 may be mounted, physically positioned, operatively coupled to, and/or fastened to the robotic arm 128 and in particular, either on or adjacent the charging plug 131, which are both carried by an end-effector of the robotic arm. The locations of the image capturing devices 130 and 134 are merely exemplary and in other examples, the image capturing devices 130 and 134 are positioned at other locations within the EV charging environment 100 or 200 as appropriate to have line-of-sight to the moving charging plug 131 and also the charging port of the EV 110. The image capturing devices 130 and 134 may be used as visualization and/or localization sensors that form part of the control system 132 for automatically controlling the robotic charging device 124 to maneuver and orient the charging plug 131 into the EV charging portal 112 for charging the EV 110.

Additionally, and/or alternatively, in other examples, the EV charging environment 100 includes a different number of capturing devices. For example, the image capturing device 134 may be optional and in other examples, the EV charging environment 100 may only include the image capturing device 130 that is on the charging plug 131.

The EV charging environment 200 further shows a working volume 204 and a non-working volume 202. The working volume 204 of the charging device 100 is a physical space in which the robotic charging device 124 may maneuver its robotic arm 128 and engage its charging plug 131 with the EV charging portal 112 of the EV 110 (i.e., a volume of functional access). A non-working volume 202 of the robotic charging device 124 is a physical space near the robotic charging device 124 where the charging device 124 is configured such that it will not attempt to charge an EV 110 that is within that space. The non-working volume 202 may include spaces where the robotic charging device 124 is incapable of effectively plugging in its charging plug 131 into the EV charging portal 112, whether because of a mechanical collision or inability to obtain a proper orientation, and/or a buffer space to provide a safe walking distance for human occupants. Accordingly, the robotic charging device 124 might not attempt to move or otherwise engage with the EV 110 when the EV 110 is within the non-working volume 202.

The working volume 204 is defined by the mechanical and kinematic abilities of the robotic charging device 124 and the arrangement of the EV charging system 120 in its installation space. The working volume 204 of the robotic charging device 124 is, therefore, defined (at least in part) by the range of motion it can impart on the robotic arm 128 and the reach of its charging plug 131. In other words, the physical space defined as the working volume 204 in FIGS. 2a and 2b includes locations to which the tip of the robotic arm 124 and, consequently, its end-effector, may reach and locations to which the charging plug 131 may be inserted. The robotic charging device 124 is capable of at least rotating (yaw), pitching, and/or extending/retracting its robotic arm 128. In other words, the kinematics of robotic charging device 124 includes rotational movement and linear movement.

In some instances, the robotic charging device 124 may further controllably orient and move the charging plug 131 independently of the arm 128. This provides an extended range of motion and orientation that enables the charging device 124 to accurately position the charging plug 131 for insertion into the charging portal 112.

In some examples, the robotic arm 128 and the charging plug 131 are separate components and/or devices. For instance, the EV charging system 120 might not include the charging plug 131. In other words, the robotic arm 128 may be configured to control, move, and/or maneuver an existing charging plug 131 within the environment 100 such that it is insertable into the charging portal 112. In some instances, the charging plug 131 is located at the distal end of the robotic arm 128. For instance, the charging plug 131 may be situated at the tip of the robotic arm 128. Additionally, and/or alternatively, the charging plug 131 may be located above and/or below the tip of the robotic arm 128. Additionally, and/or alternatively, the charging plug 131 may be located a certain distance (e.g., several inches) away from the tip of the robotic arm 128.

In some variations, the EV charging system 120 may also include a user feedback/user interface (UI) for communicating with an operator of the EV 110 or otherwise communicating with a user of the EV charging environment 100. For example, the EV charging system 120 may include a UI/perception display. The display may provide information to a user (e.g., localization or charging feedback). For instance, the display may inform the user in real time with respect to the position of the EV 110 and the charging status. With regard to the localization/position feedback, the display may give a signal for the operator on positioning/stopping the EV 110 (similar to what a user may experience at a drive-through car wash). For example, the display may alert the user to move forward, back, or angle right/left. With regard to the charging state, the display may alert the user to a charging status, e.g., charging, charged, percent charge, or remaining charge time. As should be apparent, other user feedback information is contemplated within the scope of this disclosure.

In some variations, the display may be mounted on the charging device. The display may, however, alternatively and/or additionally be provided external to the robotic charging device 124. For example, a display may be at a remote mount, which is positioned near the EV 110 (such as a control point for paying for (or interacting with) the EV charging system 120). A projector may also project a projected image conveying user feedback information. The robotic charging device 124 may also wirelessly transmit (e.g., via Bluetooth, Wi-Fi, etc.) the user feedback information to a user device (e.g., a mobile telephone or display of the EV 110).

Figure 3:
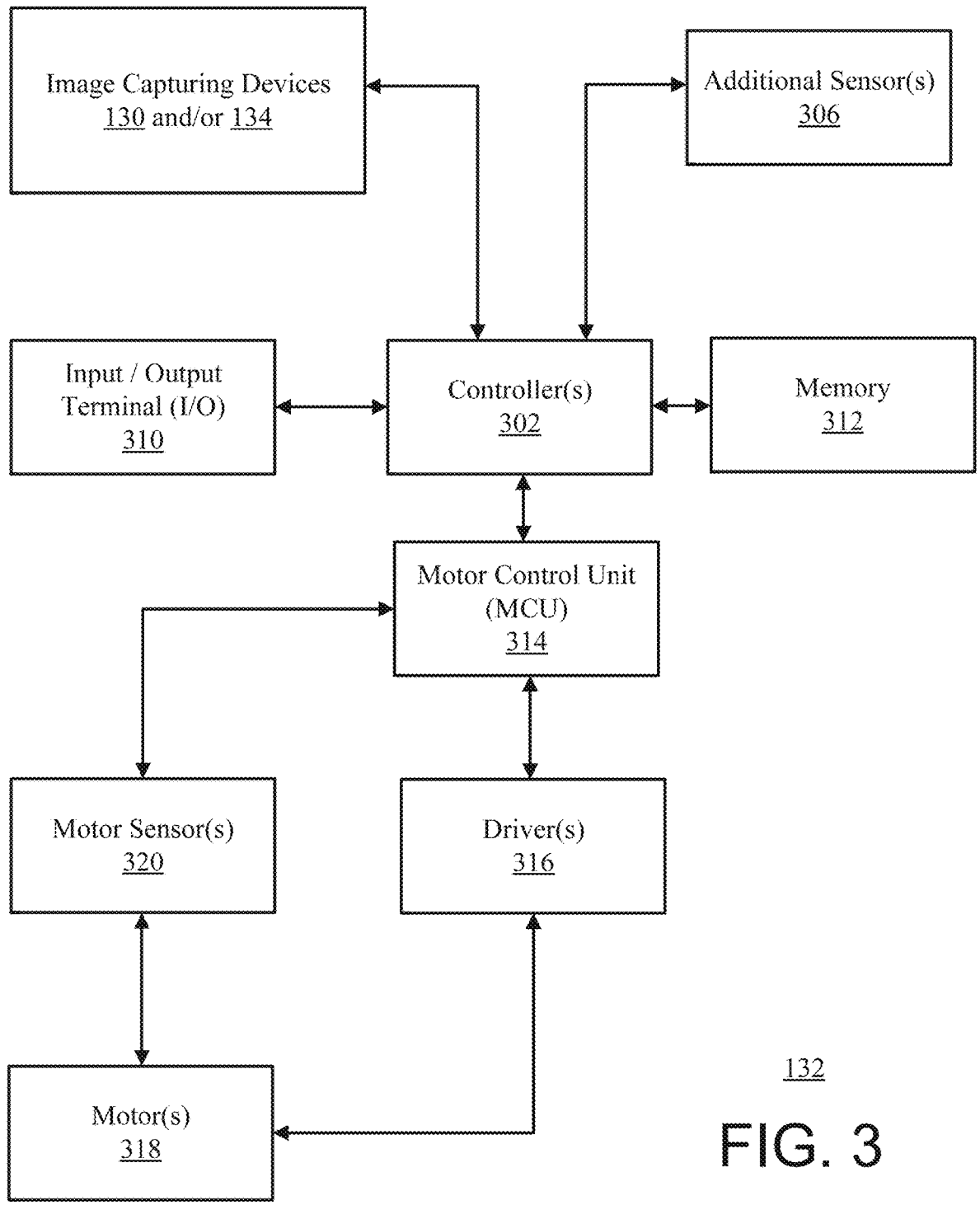
FIG. 3 is a schematic illustration of an exemplary control system according to one or more embodiments of the present disclosure.

FIG. 3 is a schematic illustration of an exemplary control system according to one or more embodiments of the present disclosure. It will be appreciated that the control system shown in FIG. 3 is merely an example and additional/alternative embodiments of the control system 132 from environment 100 are contemplated within the scope of the present disclosure.

The control system 132 includes a controller 302. The controller 302 is not constrained to any particular hardware, and the controller's configuration may be implemented by any kind of programming (e.g., embedded Linux) or hardware design—or a combination of both. For instance, the controller 302 may be formed by a single processor, such as general purpose processor with the corresponding software implementing the described control operations. On the other hand, the controller 302 may be implemented by a specialized hardware, such as an ASIC (Application-Specific Integrated Circuit), an FPGA (Field-Programmable Gate Array), a DSP (Digital Signal Processor), or the like.

The controller 302 is in electrical communication with memory 312. The memory 312 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM), a ROM, an erasable programmable read-only memory (EPROM or Flash memory), a compact disc read-only memory (CD ROM), or other tangible optical or magnetic storage device. The memory 312 may store corresponding software such as computer-readable instructions (code, script, etc.). The computer instructions being such that, when executed by the controller 302, cause the controller 302 to control the control system 132 to provide for the operation of the EV charging system 120 as described herein.

The controller 302 is configured to provide and/or obtain information from the image capturing devices 130 and/or 134. For instance, the image capturing devices 130 and/or 134 may capture one or more images, or a continuous succession of images, that include the object 114 and may provide the images to the controller 302. The controller 302 may use these images (alone or in combination with other elements of the control system 132) to determine the physical location, orientation, and/or status of the charging plug 131, the robotic arm 128, the EV 110, and/or the EV charging portal 112. For example, the controller 302 may use these images to determine the physical location of the EV charging portal 112 and provide instructions or commands to maneuver the robotic arm 128 such that it is insertable into the EV charging portal 112. The image capturing devices 130 and/or 134 may be physically located at the charging device 124 or elsewhere in the charging system 120. In the preferred embodiment in FIG. 2a, the image capturing device 130 is located at the charging plug 131 (e.g., at top, left, right, bottom of the charging plug 131).

In some examples, the image capturing devices 130 and/or 134 are 2-D cameras or other 2-D image capturing devices, for example, a charge-coupled device (CCD), or another type of electronic image acquisition device. In some instances, the image capturing devices 130 and/or 134 include a light emitter. For instance, the light emitter may emit light such as a flash or another form of illumination, in a visible or invisible range. In some instances, the light emitted belongs in the infrared (IR) spectrum and/or ultraviolet (UV) spectrum but other types of radiation can be used. The image capturing devices 130 and/or 134 may capture the images of the object 114 using the light/illumination that results from retro-reflection or reflection of the radiation emitted by the emitter.

Additional sensors 306 may optionally be included within the control system 132. These additional sensors 306 may provide information to the control system 132 in conjunction with (or as a back-up to) information (e.g., images) provided by the image capturing devices 130 and/or 134. For example, these additional sensors 306 may include a light sensor and/or flash camera sensor system. In other words, instead of the light emitter being part of the image capturing devices 130 and/or 134, the EV charging system 120 may include an additional sensor that provides light/illumination for images captured using the image capturing devices 130 and/or 134.

Additionally, and/or alternatively, the additional sensors 306 may optionally include another image capturing device (2D or 3D), a LiDAR sensor, an RFID sensor, an ultrasonic sensor, a capacitive sensor, an inductive sensor, a magnetic sensor, and/or the like, to refine the trajectory of the robot end-effector as it guides a plug to mate with the vehicle charging port after a visual identification of the location of the vehicle charging port has been made using visual or video information as described herein. In general, any sensor that can provide a signal that enables or enhances the control system's 132 ability to maneuver the charging plug 131 for easy and safe insertion into the charging portal 112 of the EV 110 may be included in the control system 132.

In some variations, the image capturing devices 130 and/or 134 and additional sensors 306 form a flash-based photography sensing system. The flash-based photography system includes at least image capturing device (e.g., device 130), a light emitter (e.g., used for emitting a flash), and the object 114. In operation, the light emitter cycles the flash, or provides a constant light by keeping the light emitter continuously illuminated, which reflects light off the object 114, and the resulting image captured by the image capturing devices 130 and/or 134 isolates the object 114.

The control system 132 is configured to drive motors 318 of the charging device 124. As used herein, motors 318 include AC motors, DC motors, gear-driven motors, linear motors, actuators, or any other electrically controllable device used to effect the kinematics of the charging device. Accordingly, the control system 132 is configured to automatically and continually determine the physical state of the charging system 120 and automatically control the various motors 318 of the charging device 124 to maneuver the robotic arm 128 including the charging plug 131 to be insertable into the charging portal 112 and retract the charging plug 131 after stopping or ceasing the charging of the EV 110.

The control system 132 may further include a motor control unit (MCU) 314 (also referred to herein as a motor controller), e.g., as part of the controller 302 or a separate device. The MCU 314 controls motor drivers 316 using feedback from motor sensors 320 (e.g., encoders) in order to provide real time control of the motors 318. Accordingly, the MCU 314 receives instructions for controlling the motors 318 (e.g., receives motor/actuator control signals from the controller 302), and interprets those instructions, in conjunction with feedback signals from the motor sensors 320, to provide control signals to the motor drivers 316 for accurate and real-time control of the motors 318 (e.g., sends motor/actuator driver signals). The motor drivers 316 transform the control signals, as communicated by the MCU 314, into drive signals for driving the motors 318 (e.g., sends individual operation signals to the motors/actuators). In another embodiment, the MCU 314 is integrated with circuitry to directly control the motors 318.

The MCU 314 may be included as part of the controller 302 or a stand-alone processing system (e.g., a microprocessor). Accordingly, just like the controller 302, the MCU 314 is not constrained to any particular hardware, and the MCU's configuration may be implemented by any kind of programming or hardware design—or a combination of both.

The control system 132 may include an input/output (I/O) terminal 310 for sending and receiving various input and output signals. For example, the control system 132 may send/receive external communication to a user, a server (e.g., a billing server), a power unit, etc. via the I/O terminal 310. The control system 132 may further control the user feedback interface via the I/O terminal 310 (or otherwise).

Figure 4:
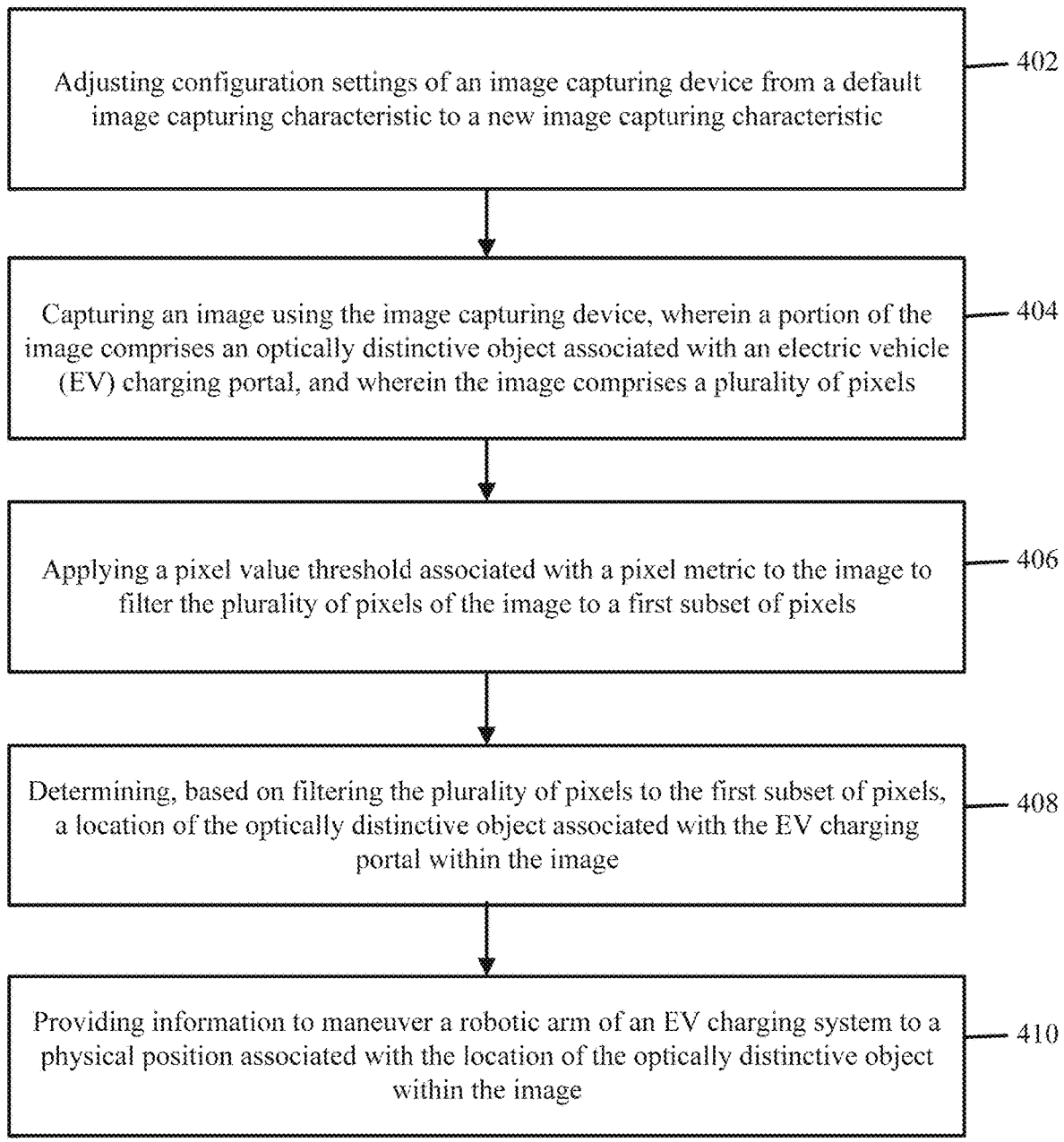
FIG. 4 illustrates a process for operating an EV charging system to charge an EV according to one or more embodiments of the present disclosure.

FIG. 4 illustrates a process 400 for operating the EV charging system 120 to charge the EV 110 according to one or more embodiments of the present disclosure. The process 400 may be performed by the control system 132 and in particular, the controller 302 shown in FIG. 3. However, it will be recognized that any of the following blocks may be performed in any suitable order and that the process 400 may be performed in any suitable environment including EV charging environment 100, 200, and/or additional/alternative environments and by any suitable controller or processor.

At block 402, the control system 132 adjusts configuration settings of an image capturing device (e.g., the image capturing device 130 and/or 134) from a default image capturing characteristic to a new image capturing characteristic. For example, the default and new image capturing characteristic may be a white or color balancing characteristic. White balancing or color balancing is a global adjustment of the intensities of colors (e.g., white) such that an image renders the colors properly. For instance, the pixels from images captured or acquired by a camera or other image capturing devices are transformed from acquired or original values to new values (e.g., new red green blue (RGB) values and/or luminance values) that are appropriate for color reproduction or display. The white balancing characteristics or settings are used for this transformation.

The default white balancing characteristic may be a factory default white balancing setting or an original equipment manufacturer (OEM) white balancing setting. The adjusted new white balancing characteristic may be any new white balancing setting that is not the OEM setting and enables the control system 132 to better identify the object 114 within images captured using the image capturing device 130. For example, the white balancing characteristics may be used such that the average value (e.g., average luminance value) of the total pixels within an image is equal to a certain shade of white or other color. Accordingly, by the control system 132 adjusting the white balancing characteristics of the image capturing device 130 to a new characteristic, the average value of the total pixels may be adjusted as well such that it causes pixels representing the object 114 to better stand out from other objects or structures within the image. In other words, the new white balancing characteristic may cause the other structures or objects within the image to wash out or become more dim; however, due to the object 114 having a retroreflective/reflective coating or surface, the pixels of the object 114 are not as impacted and therefore causes a more clear differentiation between the pixels of the object 114 and the rest of the pixels within the image.

In some instances and as described above, the image capturing device 130 is a 2-D camera and the default image capturing characteristic may be an OEM image capturing setting (e.g., OEM white balancing setting) associated with the 2-D camera.

In some variations, the memory 312 stores one or more white balancing characteristics. Then, at block 402, the controller 302 retrieves a white balancing characteristic from memory 312 and provides instructions to the image capturing devices 130 and/or 134 to set the white balancing characteristic of the image capturing devices 130 and/or 134 to the white balance characteristic retrieved from memory 312. Additionally, and/or alternatively, in some examples and even using the new white balancing characteristic, the control system 132 may have difficulty identifying the object 114 from the captured image. In such examples, the control system 132 may use one or more additional white balancing characteristics to capture the image with the object 114 (e.g., by adjusting the white balancing characteristics of the image capturing devices 130 and/or 134 from the new white balancing characteristic to an additional white balancing characteristic). For example, the controller 302 retrieves an additional (e.g., second) white balancing characteristic from memory 312 and provides instructions to the image capturing devices 130 and/or 134 to set the white balancing characteristic of the image capturing devices 130 and/or 134 to the second white balance characteristic.

At block 404, the control system 132 captures an image using the image capturing device (e.g., 130 and/or 134). The captured image includes a multitude of pixels and a portion of the captured image includes the object 114, which is associated with the EV charging portal 112. The image capturing device may capture the image using the new white balancing characteristic from block 402.

For example, an operator of the EV 110 may seek to charge their vehicle using the EV charging system 120. The EV charging system 110 may capture one or more images of the EV 110 (e.g., the EV charging portal 112) and use the images to maneuver the robotic arm 128 to the EV charging portal 112. To better distinguish the EV charging portal 112 within the image, the object 114 such as a retroreflective/reflective sticker, label, or material may be applied to (e.g., adaptable to) the EV charging portal 112. For instance, the operator of the EV 110 may apply the object 114 to the EV charging portal 112.

As described above, the object 114 is and/or includes a sticker, tag, label, and/or structure that may be designed with a retroreflective material, reflective material, and/or other light reflecting materials. In some instances, the object 114 is used to amplify a flash or light response (e.g., light/illumination response from a light emitter) within a localized area of the captured image (e.g., the area representing the EV charging portal 112). Additionally, and/or alternatively, certain patterns and/or colors may be applied to the object 114 to accentuate this response, especially as it may amplify the response of the image capturing characteristics set by the control system 132 at block 402. As will be described below, by using the object 114 on the EV charging portal 112, the control system 132 may be able to use the image capturing features (e.g., white balancing features) of the image capturing devices to dim many of the pixels besides the object 114, which will make the segmentation process easier through using one or more thresholds.

In some variations, the objects 114 may include and/or be light pipes and/or light transmissors such as optical fibers and the like, which collect light from the light emitter and re-emit the collected light at focused localized points. The light transmissors may a flexible optical object (e.g., flexible optical fiber) that permits light to enter one end. The light follows a path, which might not be a straight path, and exits the other end. In some instances, the objects 114 may include and/or be plastic moldings (e.g., molded into plastic using multi-material injection molding).

In some examples, the control system 132 uses a light emitter to capture the image. For example, the light emitter may emit light or illumination (e.g., a flash) that is used by the image capturing device 130 and/or 134 to capture the image. As described above, the image capturing device 130/134 may include the light emitter and/or the additional sensors 306 may include the light emitter. The control system 132 may provide instructions to the light emitter to provide the light/illumination for capturing the image. In some variations, the light or illumination emitted by the light emitter may be in a non-visible light spectrum (e.g., an infrared (IR) light and/or ultraviolent (UV) light). For example, the light emitter may be non-visible light emitter that is configured to emit non-visible illumination (e.g., illumination that has a light frequency in a range that is not visible by humans such as IR light or UV light).

In some instances, the control system 132 captures more than one image. For instance, the control system 132 may use the image capturing device 130 to capture multiple images. Additionally, and/or alternatively, the control system 132 may use another image capturing device (e.g., image capturing device 134) to capture one or more additional images. The control system 132 may use the multiple images to identify the physical position of the object 114 and maneuver the robotic arm 128 and/or charging plug 131.

Figure 5A:
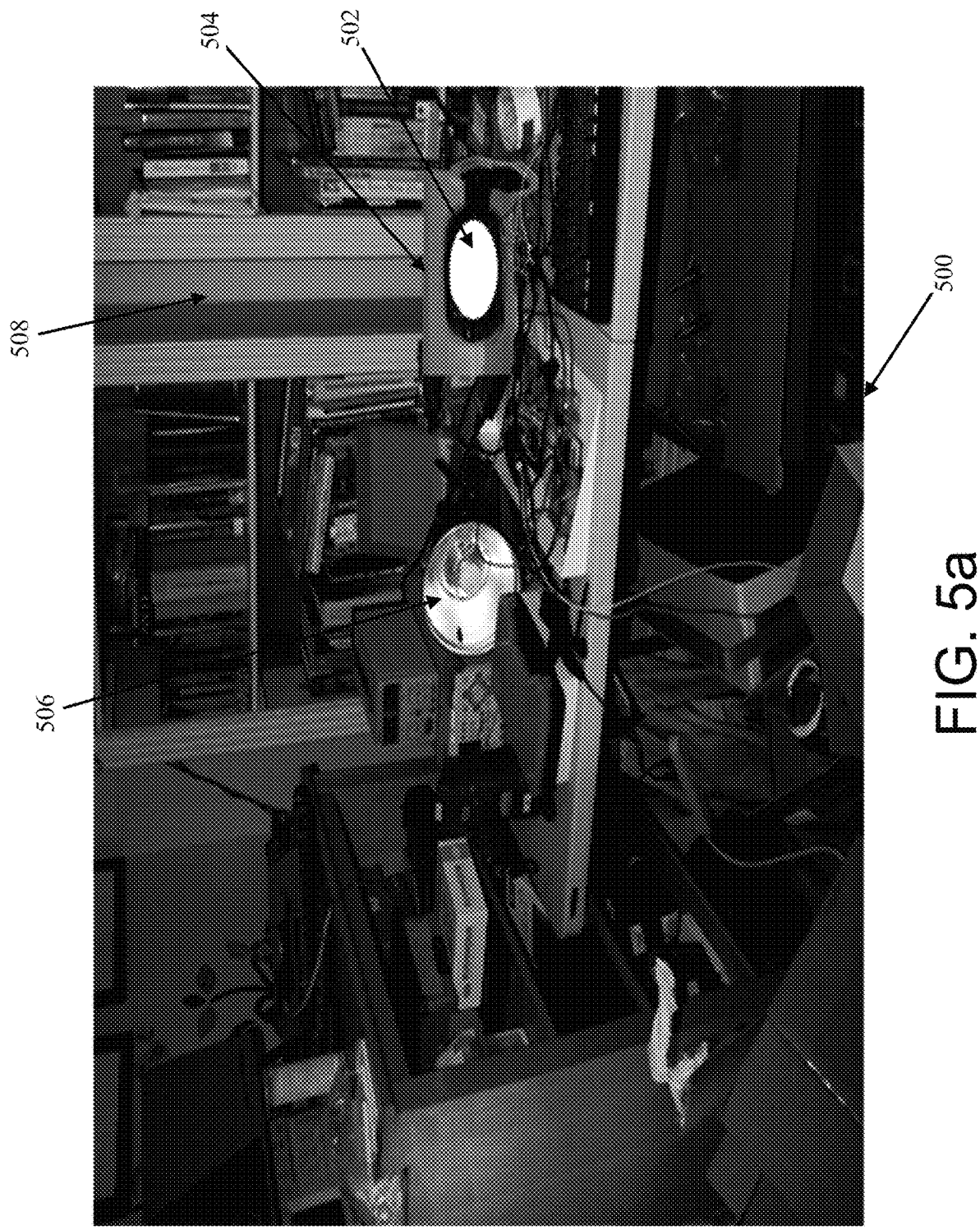
FIGS. 5a and 5b depict an image captured by an image capturing device and then filtered by the control system according to one or more embodiments of the present disclosure.

FIG. 5a depicts an image 500 captured by an image capturing device such as image capturing device 130. The image simulates the presence of an EV charging portal 504 in an environment such as a residential garage in which numerous other items may be within the field of view of the image capturing device 130 and/or 134. As shown, the image 500 shows an optically distinctive object 502 and an EV charging portal 504. The image 500 also shows additional objects, structures, and other background items. One particular object, background object 506, shown in image 500 also has a highly reflective structure and characteristic. Additionally, image 500 also includes structure 508, which has been dimmed due to adjusting the white balancing characteristics as described above. The object 506 may have a similar structure and characteristic to a headlight or tail light of a vehicle such as EV 110.

The image 500 will be used to describe the classification, segmentation, and/or localization processes below. However, it will be noted that image 500 is merely an example and the image capturing device 130 and/or 134 may capture other images that include additional/alternative background objects, structures, and/or items such as the actual EV 110 from FIGS. 1, 2a, and/or 2b.

At block 406, the control system 132 applies a pixel value threshold associated with a pixel metric to the image to filter the plurality of pixels of the image to a first subset of pixels. For instance, after capturing the image at block 404, the control system 132 filters out pixels of the image using a threshold such that the control system 132 analyzes a portion or subset of pixels within the image instead of every pixel within the image. By using the threshold, the computational processing required for the classification, segmentation, and/or localization processes used to identify the EV charging portal 112 within the image is drastically reduced due to analyzing a fewer amount of pixels. Furthermore, by using the object 114 applied to the EV charging portal 112, adjusting the image capturing characteristic of the image capturing device at block 402, and/or using a light/illumination (e.g., flash), the threshold may be set more aggressively to filter out even more pixels from the image, which may further reduce the computational processing.

The control system 132 may set a pixel value threshold and/or retrieve a pixel value threshold from memory 312. The pixel value threshold and the pixel metric represent characteristics or properties associated with the pixels. For instance, the pixel metric may be a color characteristic such as red, green, blue (RGB) values that represent a color of the associated pixel. Additionally, and/or alternatively, the pixel metric may be a brightness or light intensity characteristic such as a luminance value. Similarly, the pixel value threshold may also be a color characteristic (e.g., RGB value) and/or a light intensity characteristic (e.g., luminance value).

In some examples, the memory 312 may include one or more set or pre-defined pixel value thresholds and the control system 132 may retrieve/use the pre-defined thresholds from the memory 312. In other examples, the control system 132 may determine and/or set the thresholds based on one or more captured images and/or the pixels within the images. For instance, the control system 132 may set the thresholds such that a percentage of pixels (e.g., four percent) remain after applying the threshold.

The control system 132 filters out pixels from the image based on the pixel value threshold. For instance, the pixel value threshold may be a particular luminance value. The control system 132 may filter out pixels from the image that are below the particular luminance value of the pixel value threshold such that only a portion of the pixels (e.g., the first subset of pixels) from the image that are above the threshold remain.

Additionally, and/or alternatively, the pixel value threshold may be associated with the color characteristic of the pixels such as the RGB values of the pixels. The control system 132 may filter out pixels from the image that are below a color characteristic value to determine the first subset of pixels. In other words, each of the RGB values may be between 0 and 255. The color characteristic value may be a combination of the three values (e.g., the control system 132 combines each of the RGB values to determine the color characteristic). The control system 132 filters out pixels based on the combined value of the RGB values being below the pixel value threshold such that only pixels with combined RGB values above the pixel value threshold remain. Additionally, and/or alternatively, the control system 132 may filter out pixels from the image based on an individual RGB value (e.g., the control system 132 filters out pixels with red values that are below the threshold).

Figure 6:
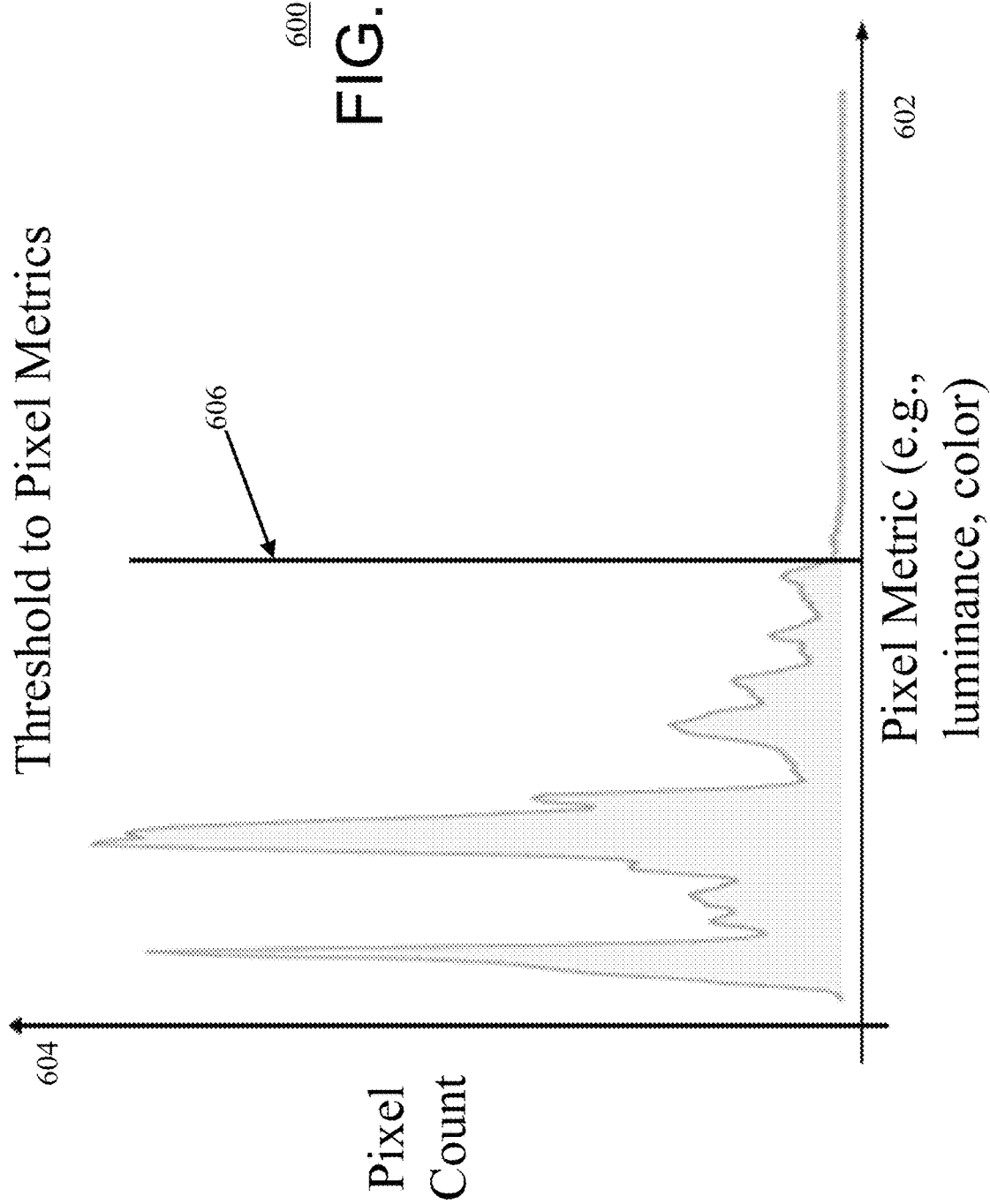
FIG. 6 depicts a graphical representation of applying a threshold to a captured image to identify an EV charging portal according to one or more embodiments of the present disclosure.

FIG. 6 depicts a graphical representation 600 of applying a threshold to a captured image to identify an EV charging portal and will be used to describe block 406 in more detail. For instance, the x-axis 602 represents the pixel metric (e.g., luminance and/or color characteristics) and the y-axis 604 represents the pixel count of the image captured at block 402. Line 606 represents the pixel value threshold (e.g., a luminance value or color characteristic value). The control system 132 may filter out pixels that are below (e.g., to the left) the threshold 606 such that only the pixels above the threshold (e.g., to the right and also referred to as the first subset of pixels) remain. As shown, by using the threshold, the control system 132 may analyze only a fraction of the pixels from the image, which may reduce the computation processing required to identify the EV charging portal 112.

At block 408, the control system 132 determines a location of the object 114 associated with the EV charging portal 112 within the image based on filtering the plurality of pixels to the first subset of pixels. For example, after filtering the plurality of pixels to determine the first subset of pixels at block 406, the control system 132 determines or identifies a location of the object 114 within the captured image. For instance, the control system 132 may perform one or more image processing algorithms (e.g., processes, methods, and/or techniques) on the first subset of pixels (e.g., the remaining pixels after using the threshold) to determine the location of the object 114 and/or the EV charging portal 112.

In other words, instead of performing the image processing algorithm such as an edge detection technique on all of the pixels within the image, the control system 132 performs the image processing algorithm on only a fraction of the pixels (e.g., the first subset of pixels) from the image, which will reduce the computational bandwidth required to identify the object 114 and/or the EV charging portal 112. The image processing algorithm may be and/or include any image processing algorithm that enables the control system 132 to identify the object 114 within the image, the EV charging portal 112 within the image, the location of the object 114 within the image, and/or the location of the EV charging portal 112 within the image.

In some examples, blocks 406 and/or 408 may be part of and/or in addition to the control system 132 performing one or more image classification processes, image segmentation processes, image localization processes, and/or image registration processes. Image classification is an approach of classifying objects or structures within the image using contextual information such as focusing on the relationship of nearby pixels. Image segmentation is the process of partitioning images into segments (e.g., sets of pixels) in order to simplify and/or change the presentation of an image into something more meaningful and/or easier to analyze. Image localization is a process to determine locations of objects/structures (e.g., object 114) within the image. Image registration is the process of transforming sets of data into another coordinate system (e.g., transforming the location of the object 114/EV charging portal 112 within the image into a coordinate system usable by the robotic charging device 124 to maneuver the robotic arm 128/charging plug 131 to charge the EV 110).

Figure 7:
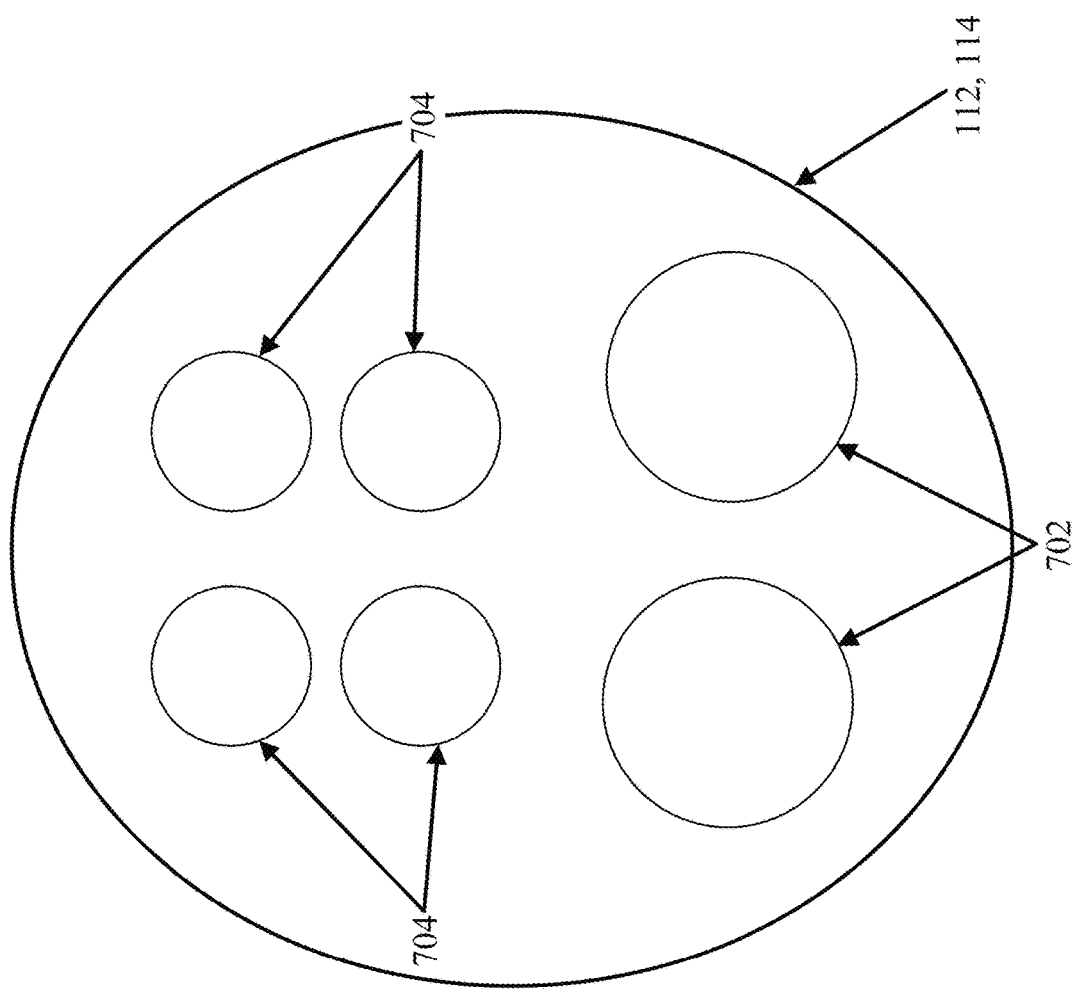
FIG. 7 depicts an exemplary configuration of an EV charging portal according to one or more embodiments the present disclosure.

For example, the control system 132 determines the location of the object 114 within the captured image based on analyzing the remaining pixels (e.g., first subset of pixels) using a known geometric profile (e.g., geometry/geometric shape(s)) of the object 114. FIG. 7 depicts an exemplary configuration of the EV charging portal 112 according to one or more embodiments the present disclosure. For instance, the object 114 may be a sticker or label that is adaptable to (e.g., placed on the surface of) the EV charging portal 112. The EV charging portal 112/the object 114 includes certain geometric shapes such as two large circles 702 and four smaller circles 704. The control system 132 may use the known geometric profile (e.g., two large circles 702 and four smaller circles) of the EV charging portal 112 to identify the pixels representing the EV charging portal 112 within the captured image.

The EV charging portal 112 shown on FIG. 7 is merely an example and in other instances, the EV charging portal 112 may be another type of EV charging portal that enables the EV charging system 120 to charge the EV 110. For example, in some instances, the EV charging portal 112 may be a Combined Charging System Type 1 or 2 (CCS 1 or CCS 2) charging portal. The control system 132 may use the known geometric profile for the CCS 1 or CCS 2 charging portals to determine the location of the object 114 within the captured image.

Figure 5B:
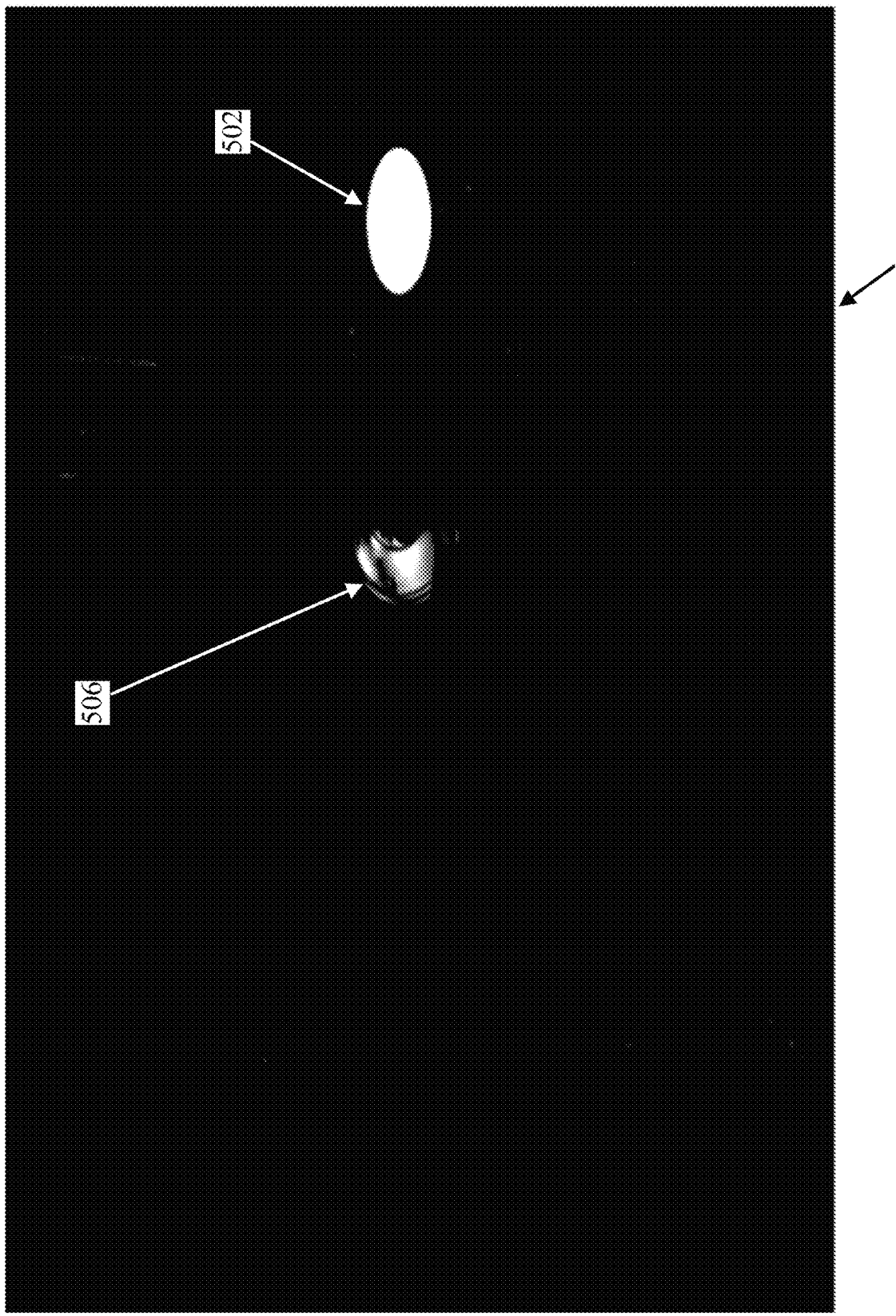

Referring to FIG. 5a, the image 500 may include the EV charging portal 502, the optically distinctive object 502, and another background object 506 (e.g., similar in structure to a headlight or taillight of the EV 110). By filtering the pixels based on the threshold, the control system 132 may remove a majority of the pixels and the pixels remaining (e.g., the first subset of pixels) may include the objects 502 and 506. For instance, FIG. 5b depicts the remaining pixels (e.g., pixels representing objects 502 and 506) after filtering out the pixels based on the threshold. Then, the control system 132 may determine a location of the object 502 (e.g., the object that is applied to the EV charging portal) by analyzing the first subset of pixels using a known profile of the object 502. In other words, the control system 132 may determine the object 506 is a background 506 because it does not have the same geometry as a charging portal. The control system 132 may determine the object 502 is the one applied to the charging portal because the known geometry of the charging portal matches the geometry of the object 502.

To put it another way, by using the threshold, the optically distinctive object applied to the charging portal, and/or the flash, the control system 132 may need to perform analysis on only a portion of the pixels from the image (e.g., pixels representing objects 502 and 506) rather than on the entire image, which will reduce the computational bandwidth required.

At block 410, the control system 132 provides information (e.g., one or more signals, instructions, and/or commands) to maneuver the robotic arm 128 of the EV charging system 120 to a physical position associated with the location of the object 114 within the captured image. For example, based on the determined location of the object 114 from block 408, the control system 132 may maneuver (e.g., move/orient) the robotic arm 128 and/or the charging plug 131 to a physical position.

For instance, based on the determined location of the object 114, the control system 132 sends control signals to maneuver the robotic arm 128/charging plug 131 such that it is insertable into the charging portal 112. In other words, the control signals include instructions used to operate the motors 318 to correctly move and position the charging plug 131 to charge the EV 110. The control signals may further include instructions to insert the charging plug 131 into the charging portal 112 and/or retract the robotic arm 128/the charging plug 131 after charging the EV 110.

More particularly, the control system 132 determines motor control signals, which are configured to (when executed) controllably operate motors 318 to position and orient the arm 128 within the working volume to a position where the charging portal 112 is reachable by the charging plug 131. The control system 132 then sends those motor control signals to execute the specified movements. The motors 318 may include a plurality of motors collectively configured to (ultimately) position the distal end of the charging plug 131 to be in reach of the charging plug 131.

The control system 132 may also determine actuator control signals, which are configured to adjust the orientation and/or the position of the charging plug 131 to align the charging plug 131 with the charging portal 112. The control system 132 then sends those actuator control signals to execute the specified movements. The motors 318 include actuators specifically for fine-tuning the orientation/position of the charging plug 131, and the actuator control signals are directed at controlling such actuators.

The control system 132 further determines further motor control signals, which are configured to operate the motors 318 to insert the charging plug 131 into the charging portal 112. The control system 132 then sends those further motor control signals to execute the specified movements. Subsequently, e.g., after charging is completed, the control system 132 determines and sends additional motor control signals, which when executed, cause the motors 318 to retract the robotic arm 128 to its fully retracted state.

The MCU 314 receives the motor/actuator control signals, and may further receive feedback signals. The feedback signals are provided by motor sensors 320 detecting the state/position of the various motors/actuators of the charging device 124. Based on the feedback signals and the motor/actuator signals, the MCU 314 determines motor driver signals and actuator driver signals. As such, the control signals may be high-level instructions for the operation (or resulting position) of the elements of the charging device 124, and the MCU 314 may interpret those high-level instructions (as informed by the feedback signals) to provide lower-level control signals for individually driving the motors/actuators. The MCU 314 sends the motor driver signals and actuator driver signals directly to at least one motor driver 316. In some examples, the MCU 314 includes circuitry capable of operating the appropriate voltage and currents for driving actuators coupled to its processing system (e.g., a microcontroller, FPGA, ASIC, etc.), and therefore, may send the motor driver signals and actuator driver directly to the motors 318.

In some variations and referring to block 404, the control system 132 receives multiple images from a single image capturing device (e.g., device 130) and/or from multiple different image capturing devices (e.g., device 130 and 134). The control system 132 may use the multiple images to maneuver the robotic arm 128 and charge the EV 110. For example, referring to blocks 406 and 408, the control system 132 applies a pixel value threshold to each of the captured images and determines a corresponding location of the object 114 within each of the images. In other words, the control system 132 filters out pixels from the plurality of images and determine the remaining pixels (e.g., second subset of pixels) left after the filtering process. The control system 132 may determine the location of the object 114 within these remaining pixels. Referring to block 410, the control system 132 uses these determined locations to maneuver the robotic arm 128 and then charge the EV 110.

In some instances, the multiple images may be from a single image capturing device 130. For instance, the control system 132 may capture each image with different light/illumination (e.g., flash) timings and/or without light/illumination from the light emitter. Then, the control system 132 may subtract the thresholded images from each other in order to eliminate additional pixels from being processed. This extends the refinement of the image registration possible with simple global mathematics, before the processor intensive applications of studying and identifying individual structures in the image must proceed.

In some examples, the multiple images may be from multiple image capturing devices. For example, the image capturing devices may be located at different positions (e.g., device 130 may be at the charging plug 131 and device 134 may be at the base of the EV charging system 120 as shown in FIG. 2a). The control system 132 may use images captured at different locations to maneuver the robotic arm 128.

In some variations, the control system 132 may capture one or more images at different timing intervals or by using one or more frequencies (e.g., 10 hertz (Hz)). The control system 132 may use the images captured that these different timing intervals/frequencies to maneuver the robotic arm 128. For example, the control system 132 may use these images to continuously determine the position/orientation/status of the robotic arm 128/charging plug 131 relative to the EV charging portal 112. The control system 132 may then maneuver the robotic arm 128/charging plug 131 closer to the position of the EV charging portal 112 at each timing interval until the charging plug 131 is insertable/inserted into the EV charging portal 112.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A plug connection system for use in autonomously charging an electric vehicle (EV), the plug connection system comprising:
   a robotic arm that is controllably extendable and retractable, wherein the robotic arm is adapted to carry a charging plug located at a distal end of the robotic arm, wherein the charging plug is configured to be controllably moveable and insertable into a charging portal of the EV;
   an image capturing device configured to capture one or more images, wherein the image capturing device is set to a new image capturing characteristic that is different from a default image capture characteristic; and
   a control system comprising:
      one or more controllers; and
      a non-transitory computer-readable medium having processor-executable instructions stored thereon, wherein the processor-executable instructions, when executed by the one or more controllers, facilitate:
         adjusting configuration settings of the image capturing device from the default image capture characteristic to the new image capturing characteristic, wherein the new image capturing characteristic and the default image capture characteristic include at least one of a white balancing characteristic, a color balancing characteristic, or an original equipment manufacturer (OEM) setting;
         capturing an image using the image capturing device, wherein a portion of the image comprises an optically distinctive object associated with the charging portal of the EV, wherein the image comprises a plurality of pixels, and wherein adjusting the configuration settings from the default image capturing characteristic to the new image capturing characteristic includes transforming the plurality of pixels from the image captured by the image capturing device from original values to new values;
         applying a pixel value threshold associated with a pixel metric to the image to filter the plurality of pixels of the image to a first subset of pixels;
         determining, based on filtering the plurality of pixels to the first subset of pixels, a location of the optically distinctive object associated with the charging portal within the image; and
         providing information to maneuver the robotic arm to a physical position associated with the location of the optically distinctive object within the image.

2. The plug connection system of claim 1, further comprising:
   a light emitter configured to emit illumination for the image capturing device, and
   wherein capturing the image using the image capturing device comprises capturing the image using the illumination from the light emitter.

3. The plug connection system of claim 2, wherein the image capturing device comprises the light emitter, and
   wherein capturing the image comprises capturing a plurality of images associated with the optically distinctive object and the charging portal of the EV, wherein the plurality of images comprises:
   at least one image captured using the illumination from the light emitter; and at least one image captured using no illumination from the light emitter.

4. The plug connection system of claim 3, wherein applying the pixel value threshold comprises:
  filtering out pixels from the plurality of images using the pixel value threshold to determine a second subset of pixels, wherein each pixel from the second subset of pixels has a corresponding pixel metric that satisfies the pixel value threshold, and
  wherein providing the information to maneuver the robotic arm is based on the second subset of pixels.

5. The plug connection system of claim 1, wherein the image capturing device is situated on the charging plug, wherein the plug connection system further comprises:
  a second image capturing device configured to provide a second image to the control system, and
  wherein providing the information to maneuver the robotic arm is further based on the second image.

6. The plug connection system of claim 1, wherein capturing the image comprises capturing a plurality of images based on a set frequency, wherein the plurality of images comprises a first image captured at a first instance in time and a second image captured at a second instance in time, wherein the first and second instances in time are associated with the set frequency,
  wherein applying the pixel value threshold comprises applying the pixel value threshold to the first image and to the second image, and
  wherein providing information to maneuver the robotic arm to the physical location comprises:
    providing first instructions to maneuver the robotic arm to a first physical location based on applying the pixel value threshold to the first image; and
    providing second instructions to maneuver the robotic arm from the first physical location to a second physical location based on applying the pixel value threshold to the second image.

7. The plug connection system of claim 1, wherein the pixel value threshold is a luminance value threshold, and
  wherein applying the pixel value threshold comprises filtering the plurality of pixels of the image to the first subset of pixels based on comparing the luminance value threshold with luminance values associated with the plurality of pixels.

8. The plug connection system of claim 1, wherein the pixel value threshold is a color characteristic threshold associated with red, green, blue (RGB) values of the plurality of pixels, and
  wherein applying the pixel value threshold comprises filtering the plurality of pixels of the image to the first subset of pixels based on comparing the color characteristic threshold with the RGB values of the plurality of pixels.

9. The plug connection system of claim 1, wherein the image capturing device is a 2 dimensional (2-D) camera, wherein the plug connection system further comprises:
  the optically distinctive object adaptable to the charging portal of the EV.

10. The plug connection system of claim 1, wherein determining the location of the optically distinctive object associated with the charging portal is based on analyzing the first subset of pixels using a known geometric profile associated with the charging portal of the EV.

11. A method for a plug connection system to autonomously charge an electric vehicle (EV), comprising:
  adjusting, by a control system, configuration settings of an image capturing device from a default image capturing characteristic to a new image capturing characteristic, wherein the new image capturing characteristic and the default image capture characteristic include at least one of a white balancing characteristic, a color balancing characteristic, or an original equipment manufacturer (OEM) setting;
  capturing, by the control system, an image using the image capturing device, wherein a portion of the image comprises an optically distinctive object associated with a charging portal of the EV, wherein the image comprises a plurality of pixels, and wherein adjusting the configuration settings from the default image capturing characteristic to the new image capturing characteristic includes transforming the plurality of pixels from the image captured by the image capturing device from original values to new values;
  applying, by the control system, a pixel value threshold associated with a pixel metric to the image to filter the plurality of pixels of the image to a first subset of pixels;
  determining, by the control system and based on filtering the plurality of pixels to the first subset of pixels, a location of the optically distinctive object associated with the charging portal of the EV within the image; and
  providing, by the control system, information to maneuver a robotic arm to a physical position associated with the location of the optically distinctive object within the image.

12. The method of claim 11, wherein the robotic arm is controllably extendable and retractable, wherein the robotic arm is adapted to carry a charging plug located at a distal end of the robotic arm, wherein the charging plug is configured to be controllably moveable and insertable into the charging portal of the EV.

13. The method of claim 11, wherein capturing the image using the image capturing device comprises capturing the image using illumination from a light emitter.

14. The method of claim 13, wherein the illumination is non-visible illumination associated with a light frequency in a non-visible range.

15. The method of claim 13, wherein capturing the image comprises capturing a plurality of images associated with the optically distinctive object and the charging portal of the EV, wherein the plurality of images comprises:
  at least one image captured using the illumination from the light emitter; and
  at least one image captured using no illumination from the light emitter.

16. The method of claim 11, wherein capturing the image comprises capturing a plurality of images based on a set frequency, wherein the plurality of images comprises a first image captured at a first instance in time and a second image captured at a second instance in time, wherein the first and second instances in time are associated with the set frequency,
  wherein applying the pixel value threshold comprises applying the pixel value threshold to the first image and to the second image, and
  wherein providing information to maneuver the robotic arm to the physical location comprises:
    providing first instructions to maneuver the robotic arm to a first physical location based on applying the pixel value threshold to the first image; and
    providing second instructions to maneuver the robotic arm from the first physical location to a second physical location based on applying the pixel value threshold to the second image.

17. The method of claim 11, wherein the pixel value threshold is a luminance value threshold, and
wherein applying the pixel value threshold comprises filtering the plurality of pixels of the image to the first subset of pixels based on comparing the luminance value threshold with luminance values associated with the plurality of pixels.

18. The method of claim 11, wherein the pixel value threshold is a color characteristic threshold associated with red, green, blue (RGB) values of the plurality of pixels, and
wherein applying the pixel value threshold comprises filtering the plurality of pixels of the image to the first subset of pixels based on comparing the color characteristic threshold with the RGB values of the plurality of pixels.

19. A non-transitory computer-readable medium having processor-executable instructions stored thereon, wherein the processor-executable instructions, when executed by one or more controllers, facilitate:
adjusting configuration settings of an image capturing device from a default image capturing characteristic to a new image capturing characteristic, wherein the new image capturing characteristic and the default image capture characteristic include at least one of a white balancing characteristic, a color balancing characteristic, or an original equipment manufacturer (OEM) setting;
capturing an image using the image capturing device, wherein a portion of the image comprises an optically distinctive object associated with a charging portal of an electric vehicle (EV), wherein the image comprises a plurality of pixels, and wherein adjusting the configuration settings from the default image capturing characteristic to the new image capturing characteristic includes transforming the plurality of pixels from the image captured by the image capturing device from original values to new values;
applying a pixel value threshold associated with a pixel metric to the image to filter the plurality of pixels of the image to a first subset of pixels;
determining, based on filtering the plurality of pixels to the first subset of pixels, a location of the optically distinctive object associated with the charging portal of the EV within the image; and
providing information to maneuver a robotic arm to a physical position associated with the location of the optically distinctive object within the image.

* * * * *